(12) United States Patent
Korn

(10) Patent No.: US 8,992,150 B2
(45) Date of Patent: Mar. 31, 2015

(54) DEVICE FOR CONNECTING TWO COMPONENTS, HOLDING MEANS OF SUCH A DEVICE, AND COMPONENT

(71) Applicant: Mann+Hummel GmbH, Ludwigsburg (DE)

(72) Inventor: Alexander Korn, Gueglingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 14/187,623

(22) Filed: Feb. 24, 2014

(65) Prior Publication Data

US 2014/0241830 A1    Aug. 28, 2014

(30) Foreign Application Priority Data

Feb. 25, 2013 (DE) .......................... 10 2013 003 114

(51) Int. Cl.
  *F16B 21/18* (2006.01)
  *F16B 5/02* (2006.01)
(52) U.S. Cl.
  CPC .......................... *F16B 5/02* (2013.01)
  USPC .......................... 411/353; 411/352
(58) Field of Classification Search
  USPC ............... 411/347, 352, 353, 354, 360, 366.1
  See application file for complete search history.

(56) References Cited

U.S. PATENT DOCUMENTS

| 4,431,355 | A  | * | 2/1984 | Junemann ...................... 411/360 |
| 6,457,925 | B1 |   | 10/2002 | Genick, II |
| 6,582,171 | B2 | * | 6/2003 | Bondarowicz et al. ........ 411/353 |
| 6,688,826 | B2 | * | 2/2004 | Agha et al. .................... 411/352 |
| 2002/0009351 | A1 | * | 1/2002 | Bondarowicz et al. ........ 411/353 |
| 2002/0071739 | A1 | * | 6/2002 | Mizuno et al. ................ 411/353 |
| 2003/0108401 | A1 | * | 6/2003 | Agha et al. .................... 411/353 |
| 2003/0108402 | A1 | * | 6/2003 | Agha et al. .................... 411/353 |
| 2005/0117997 | A1 |   | 6/2005 | Pinzl |
| 2011/0173892 | A1 |   | 7/2011 | Bendel et al. |
| 2011/0286813 | A1 |   | 11/2011 | Szczukowski |

FOREIGN PATENT DOCUMENTS

DE          4334926 A1     4/1995
WO      2013009804 A1     1/2013

* cited by examiner

*Primary Examiner* — Roberta Delisle
(74) *Attorney, Agent, or Firm* — James Hasselbeck

(57) ABSTRACT

A device for connecting two components (10) having at least one holding means (16) serves for holding a bolt-type fastening means (14) with which the two components (10) are securely connected and received into a respective mounting opening (18) on a first component (10). The at least one holding means (16) has a receiving section (24) with a receiving opening (25) for the fastening means (14) and at least two flexible holding arms (28) that extend at least radially relative to a longitudinal axis (26) of the receiving opening (25) away from the receiving section (24) in outward direction and with which the at least one holding means (16) can be secured in the mounting opening (18). The at least two holding arms (28), viewed radially relative to the longitudinal axis (26) of the receiving opening (25), each have a wave-shaped or a zigzag-shaped course.

7 Claims, 3 Drawing Sheets

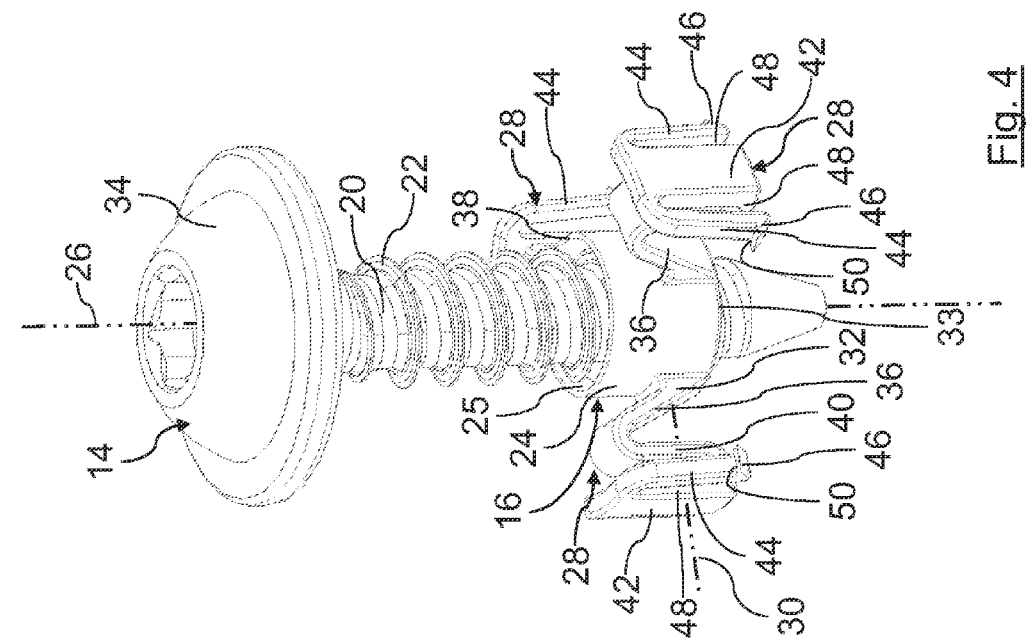
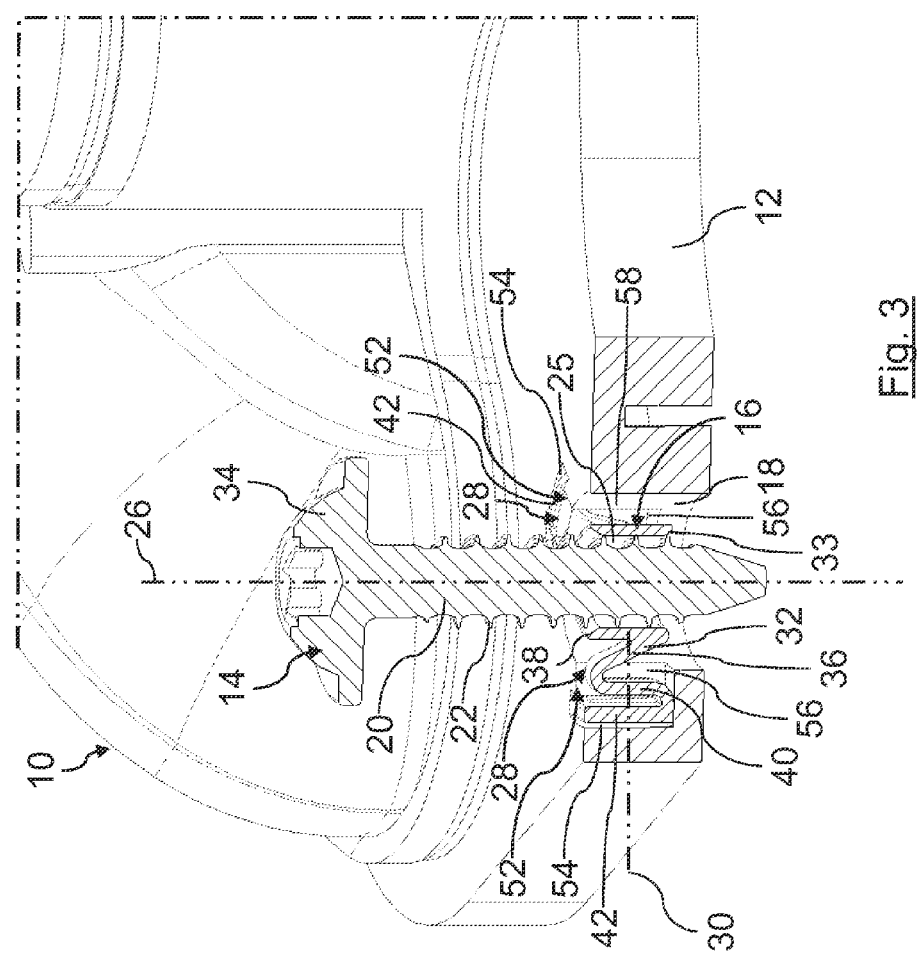

DEVICE FOR CONNECTING TWO COMPONENTS, HOLDING MEANS OF SUCH A DEVICE, AND COMPONENT

TECHNICAL FIELD

The present invention concerns a device for connecting two components, in particular of an internal combustion engine, in particular of a motor vehicle, comprising a holding means for holding a bolt-type fastening means, respectively, with which the two components can be connected to each other, in a respective mounting opening provided on a first one of the two components, wherein the at least one holding means has a receiving section with a receiving opening for the fastening means and with at least two flexible holding arms that extend at least radially relative to a longitudinal axis of the receiving opening away from the receiving section in outward direction and with which the at least one holding means can be secured in the mounting opening.

Moreover, the invention concerns a holding means of a device for connecting two components, in particular of a device according to the invention, in particular of an internal combustion engine, in particular of a motor vehicle, for holding a bolt-type fastening means with which the two components can be connected to each other, in a mounting opening provided on a first one of the two components, wherein the holding means has a receiving section with a receiving opening for the fastening means and with at least two flexible holding arms that extend at least radially relative to a longitudinal axis of the receiving opening away from the receiving section in outward direction and with which the at least one holding means can be secured in the mounting opening.

Moreover, the invention concerns a component with at least one mounting opening for a holding means, respectively, of a device for connecting two components, in particular of a device according to the invention, in particular of an internal combustion engine, in particular of a motor vehicle, wherein the at least one mounting opening is suitable for receiving the holding means for holding a bolt-type fastening means with which the two components can be connected to each other, wherein the holding means has a receiving section with a receiving opening for the fastening means and with at least two flexible holding arms that extend at least radially relative to a longitudinal axis of the receiving opening away from the receiving section in outward direction and with which the holding means can be secured in the at least one mounting opening.

BACKGROUND

U.S. Pat. No. 6,174,118 B1 discloses a holding device for a fastening screw. The holding device comprises a housing in which a receiving opening is arranged. Tab receptacles adjoin the receiving opening. An elastic receptacle is movably arranged in the receiving opening. The elastic receptacle comprises a body with tabs for locking in the tab receptacles and screw clamping parts for engaging the thread of the screw and receiving the screw in the housing. The tabs are flexible relative to each other in order to be able to insert the receptacle into the receiving opening.

It is the object of the present invention to design a device, a holding means of a device, and a component of the aforementioned kind in which the bolt-type fastening means can be captively secured on the component. Moreover, radial tolerance relative to the longitudinal axis of the receiving opening between the holding means and the mounting opening should be compensated better.

SUMMARY OF THE INVENTION

This object is solved according to the invention in that the at least two holding arms, viewed radially to the longitudinal axis of the receiving opening, respectively, have a wave-shaped or a zigzag-shaped course.

The holding means is thus secured with the at least two holding arms in the mounting opening such that the receiving section within the mounting opening can move at least in radial direction. Advantageously, between the radial outer circumferential side of the receiving section and the radial inner circumferential side of the mounting opening an annular gap can be realized. The at least two holding arms bridge this annular gap and connect in this way the receiving section directly or indirectly with the first component. Advantageously, the holding means can be secured in a basic position mechanically free of tension in the mounting opening. In this way, in the basic position mechanical loading of the at least two holding arms and/or of the receiving section can be reduced. Accordingly, material fatigue can be reduced. Moreover, the holding means can be inserted more easily and with reduced force expenditure into the mounting opening in this way.

According to the invention, the at least two holding arms are bent in radial direction in a wave shape. In this way, the at least two holding arms in radial direction can be folded or expanded like an accordion. This enables a greater radial freedom of movement of the receiving section in the mounting opening. In this way, radial tolerances between the receiving section and the mounting opening can be compensated simpler and better. Advantageously, the at least two holding arms can each have a center plane in which the projection of the waves or folds is located and which extend radially and axially to the longitudinal axis of the receiving opening. In this way, folding or stretching of the at least two holding arms in radial direction can be improved.

Advantageously, the at least two holding arms can each have an S-shaped course. In this way, the holding arms can be arranged in a space-saving way between the receiving section and an inner circumferential side of a wall that delimits the mounting opening. A respective center plane of the S-shaped holding arms can advantageously extend in radial direction. In this way, the axial extension of the at least two holding arms can be reduced, respectively.

Advantageously, the at least two holding arms can be connected monolithically with the receiving section. In this way, the at least one holding means can be produced simply in a single processing step, in particular injection-molded or cast.

Advantageously, the receiving opening of the receiving section can be of a circular cylinder shape. In this way, the bolt-type fastening means can be positioned easily in the receiving opening. The fastening means can thus also be resting areally with its radial outer circumferential side on the radial inner circumferential side of the receiving opening. In this way, the fastening means can be held more safely and more stably in the receiving section.

Advantageously, the at least one holding means can be separably connected directly or indirectly with the first component. In this way, the bolt-type fastening means can be pre-mounted within the holding means. Before assembly of the two components, the fastening means can be captively attached by means of the at least one holding means in advance on the first component. The advance attachment makes it possible to arranged the fastening means in a position and orientation on the first component in such a way that it can be easily locked with the second component after assembly of the two components. The first component can then be arranged on the second component and the premounted fastening means can be locked.

The mounting opening advantageously can be arranged directly in the first component. In this way, the holding means can be connected directly with the first component. Alternatively, the mounting opening can be provided in an adapter part which, in turn, is insertable into an appropriate opening of the first component.

Advantageously, the bolt-type fastening means can be locked by means of a rotational and/or insertion movement with the first component and/or the second component. In this way, the first component and the second component can be simply, quickly and/or stably connected to each other. Advantageously, the bolt-type fastening means can have a shaft with an outer thread or a connecting part of a bayonet-type connection. In particular, the bolt-type fastening means can be a screw. By means of a screw, great tensile forces can be transmitted. A bayonet-type connection can be locked and unlocked easily.

Advantageously, at least one of the at least two holding arms can have an insertion section in the area of its free end. The insertion section can extend advantageously parallel to the longitudinal axis of the receiving section. In this way, the holding means can be inserted in the direction of the longitudinal axis coaxially to a longitudinal axis of the mounting opening into the latter. Accordingly, the insertion section can be inserted into an appropriate holding arm receptacle provided on the first component.

In an advantageous embodiment, at least three holding arms can be distributed about the circumference on the receiving section. In this way, the bolt-type fastening means can be positioned and secured with the holding means in a simple and precise way in the mounting opening. Holding forces between the holding means and the side of the first component can thus be uniformly transmitted.

In a further advantageous embodiment, at least one of the at least two holding arms can be provided with at least one locking device at the radial outer end relative to the longitudinal axis of the receiving opening with which the at least one holding arm can engage an appropriate counter locking device provided on the first component to produce a locking connection. By means of a locking connection, the holding means can be simply and quickly fixed with the at least two holding arms on the first component. By means of the locking connection, the captive securing action of the at least one holding means on the first component can be further improved. Advantageously, all holding arms can have at least one such locking device. In this way, a uniform fixation of the holding means on the first component can be achieved.

Advantageously, the at least one locking device can be provided with at least one locking nose, respectively, on circumferentially opposed sides of the radial outer end of the at least one holding arm relative to the longitudinal axis of the receiving opening. The locking noses can be realized in a simple way. Accordingly, they can simply lock in corresponding locking nose receptacles on the first component in order to produce the locking connection. Advantageously, at least one of the locking noses in circumferential direction can be arranged to be elastically deformable and/or movable on the holding arm. In this way, the at least one locking nose can be guided with elastic tension upon insertion of the holding means into the mounting opening on the first component. By means of the elastic tension, the at least one locking nose can lock in the locking nose receptacle. For releasing the locking connection, the locking nose can be moved elastically out of the locking nose receptacle.

In a further advantageous embodiment, a smallest inner diameter of the receiving opening of the receiving section of the at least one holding means can be smaller than a greatest outer diameter of the bolt-type fastening means. In this way, the bolt-type fastening means can be secured in the receiving opening, in particular clamped. The bolt-type fastening means can be secured simply and reliably in the receiving opening of the holding means. Accordingly, the captive securing action can be further improved. Advantageously, the bolt-type fastening means can be a fastening screw with an outer thread. The fastening screw can be simply screwed or inserted into the receiving opening of the receiving section. Advantageously, the material of the receiving section can be soft, in particular elastic. In this way, a radial inner circumferential side of the receiving section can yield upon screwing in or inserting the bolt-type fastening means. Advantageously, the outer thread of the fastening screw can cut an inner thread into the radial inner circumferential side of the receiving section. Alternatively, the receiving section can have an inner thread. In this way, the fastening screw can be screwed easier into the receiving opening. Moreover, in this way, wear can be reduced in case of repeated screwing of the fastening screw into the receiving section.

In a further advantageous embodiment, the first component can have at least one holding arm receptacle for at least one of the at least two holding arms. By positioning at least one of the at least two holding arms in the at least one holding arm receptacle, an orientation of the holding means in the mounting opening can be simplified. The at least one holding arm receptacle can moreover serve as a guide for the corresponding holding arm. The holding means can thus be positioned more easily and more precisely in the mounting opening. The at least one holding arm receptacle can advantageously be suitable to receive a possible insertion section of the at least one holding arm.

Advantageously the at least one holding arm receptacle can be open toward the mounting opening at its radial inner side relative to the longitudinal axis of the mounting open. The appropriate holding arm can project through this opening. Moreover, advantageously the at least one holding arm receptacle can be outwardly open at least at one end face. With this end face opening, the at least one holding arm, in particular the insertion section, can be inserted easily upon insertion of the holding means into the mounting opening.

Advantageously, the at least one holding arm receptacle can have at least one counter locking device with which optionally a locking device of one of the at least two holding arms can engage to produce a locking connection. Advantageously, the at least one counter locking device can optionally have a locking receptacle for at least one locking nose of the at least one holding arm. In this way, a safe and reliable locking action between the at least one holding means and the first component can be realized in a simple way.

In a further advantageous embodiment, the at least one holding means can be made of flexible material, in particular plastic material, in particular polypropylene (PP), polyethylene terephthalate (PET), polybutylene terephthalate (PBT) or polyamide (PA). In this way, a flexible holding means can be realized in a simple way. The flexible holding means can simply compensate by corresponding deformation component-related and/or operation-related tolerances. Moreover, the flexible holding means can dampen vibrations. In this way, a mechanical load of the components can be reduced. Advantageously, the at least one holding means can be made of an elastic material. In this way, it can return into its original shape after deformation and corresponding elimination of the deforming forces.

The technical object is furthermore solved according to the invention with the holding means in that the at least two holding arms, viewed radially relative to the longitudinal axis of the receiving opening, each have a wave-shaped or a zig-zag-shaped course. The features and advantages which have been described above in connection with the device according to the invention apply likewise to the inventive holding means, and vice versa.

The technical object is furthermore solved according to the invention with the component in that the component has at least one holding arm receptacle for at least one of the at least two holding arms of the holding means. In this way, no separate adapter part for realizing the mounting opening is required. In other respects, the features and advantages described above in connection with the device according to the invention and the holding means according to the invention apply likewise to the component according to the invention, and vice versa.

BRIEF DESCRIPTION OF THE DRAWINGS

Further advantages, features, and details of the invention can be taken from the following description in which an embodiment of the invention will be explained in more detail with the aid of the drawing. A person of skill in the art will consider the features disclosed in combination in the drawing, the description, and the claims expediently also individually and combine them to meaningful other combinations. It is shown schematically in FIG. 1 an isometric illustration of an intake pipe part of an intake manifold of an internal combustion engine of a motor vehicle with fastening screws for attachment on further components of the intake manifold, wherein the fastening screws are captively secured by holding means in mounting openings of the intake pipe part;

FIG. 3 a section view of the detail view through the fastening screw and the holding means of the intake pipe part of FIG. 2;

FIG. 4 a detail view of one of the fastening screws with holding means of FIGS. 1 through 3.

In the Figures same components are provided with same reference characters.

DETAILED DESCRIPTION

Figure 1:
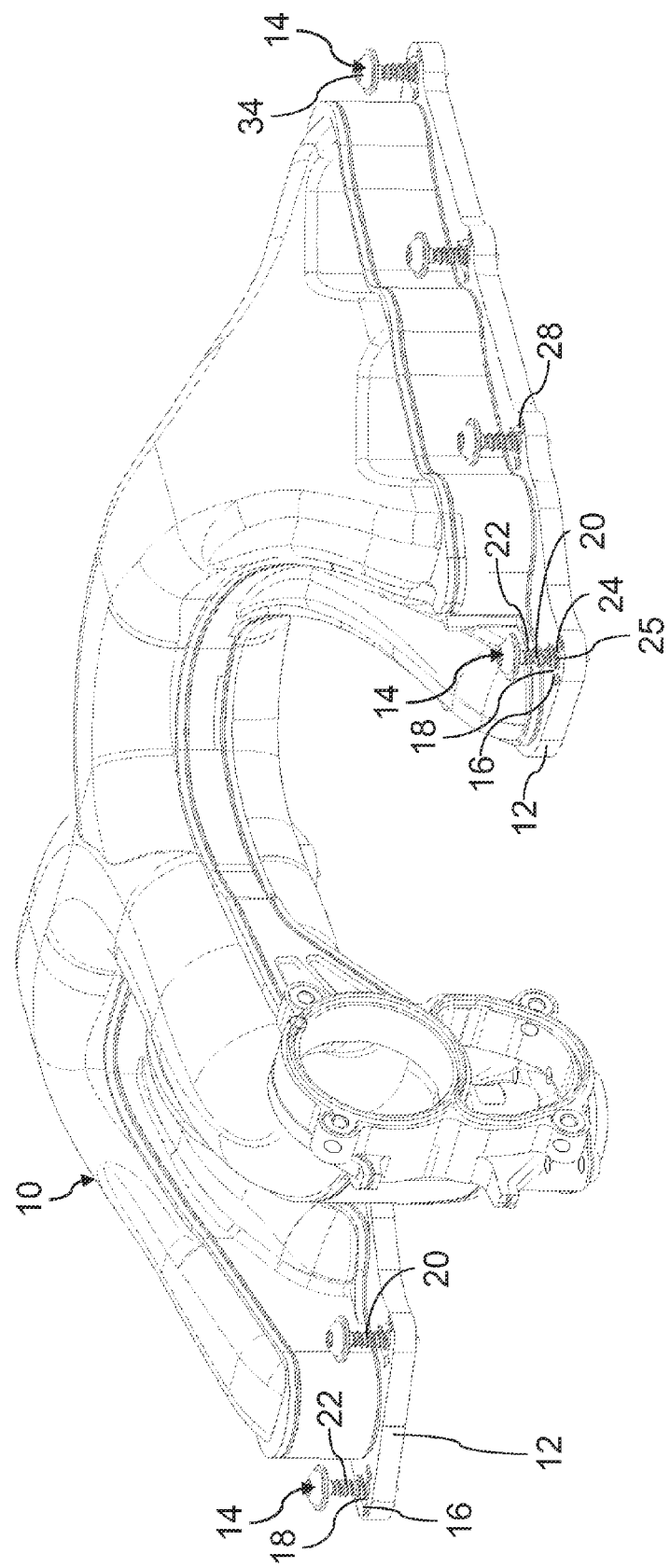

In FIG. 1, an intake pipe part 10 of an intake manifold, not illustrated otherwise, of an internal combustion engine of a motor vehicle is shown.

The intake pipe part 10 has two connecting flanges 12 with which the intake pipe part 10 can be connected to another component of the intake manifold. In the connecting flanges 12, a plurality of identical fastening screws 14 is arranged, distributed about the circumference of the connecting flanges, respectively. The longitudinal axes of the fastening screws 14 extend substantially perpendicularly to the surfaces of the connecting flanges 12. With the fastening screws 14, the intake pipe part 10 can be directly secured onto the respective other component.

Figure 2:
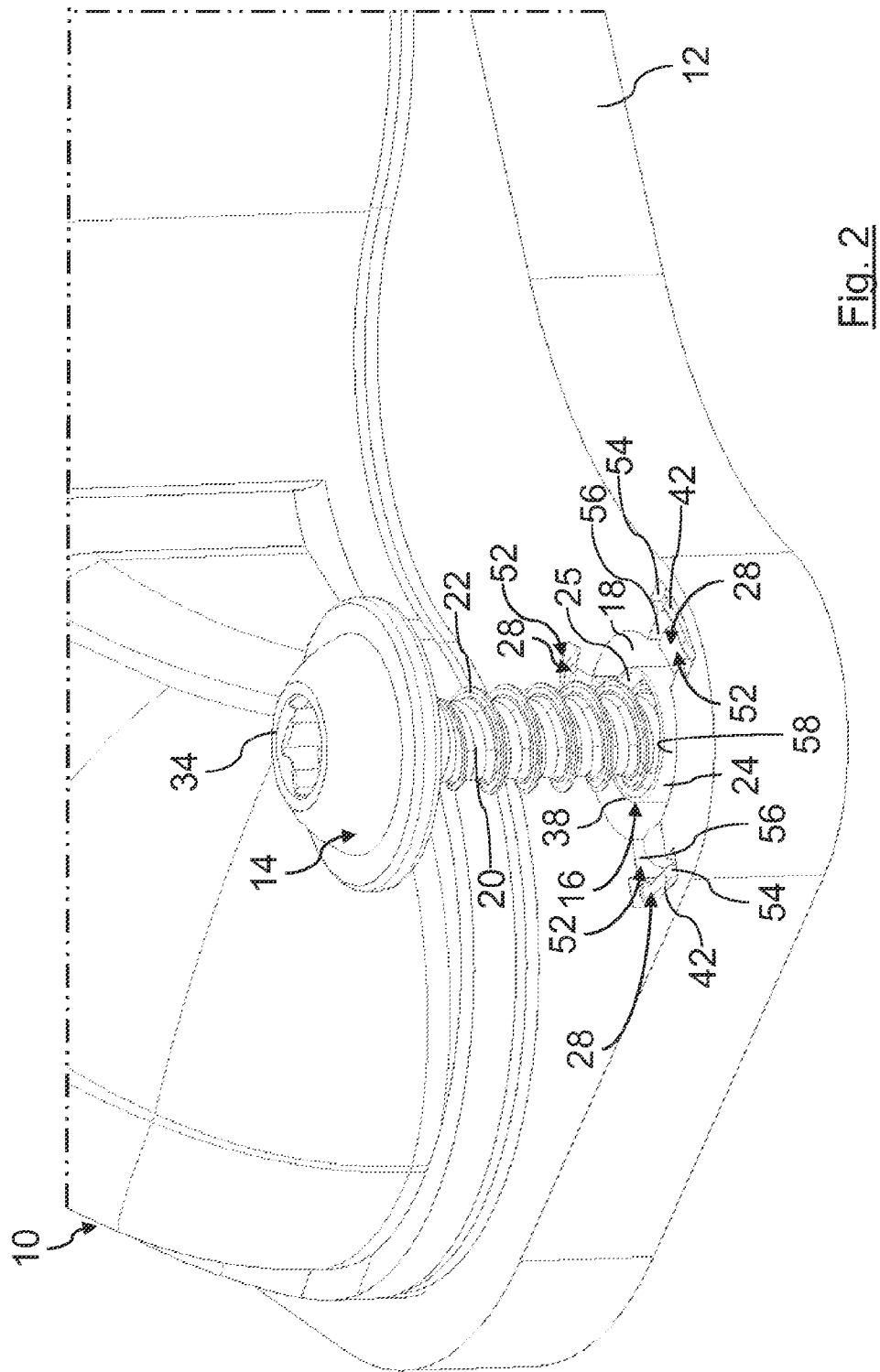
FIG. 2 a detail view of the intake pipe part of FIG. 1 in the area of one of the fastening screws with holding means.

In FIG. 2, a detail view of the intake pipe part 10 in the area of one of the fastening screws 14 is illustrated. FIG. 3 shows a longitudinal section of the intake pipe part 10 with the fastening screw 14 of FIG. 2.

The connections of the fastening screws 14 with the connecting flanges 12 are identical. In the following, one of the connections between the fastening screws 14 and the intake pipe part 10 of FIGS. 2 and 3 will be described.

The fastening screw 14 is pre-mounted by means of a holding means 16 in a penetrating mounting opening 18 in the connecting flange 12 of the intake pipe part 10. In the detail view of FIG. 4, the holding means 16 is shown together with the fastening screw 14. The mounting opening 18 is circular-cylindrical. In the pre-mounted position of FIG. 3, a shaft 20 of the fastening screw 14 projects with its tip from the mounting opening 18 on the side of the connecting flange 12 that is facing the other component onto which the flange will be mounted. The fastening screw 14 has a radially outwardly extending outer thread 22 formed on its shaft 20.

The holding means 16 is made of an elastic plastic material. Preferably, the holding means 16 is made of polypropylene or a non-reinforced polyamide. The holding means 16 comprises a circular-cylindrical sleeve-type receiving section 24. The fastening screw 14 is arranged in a penetrating receiving opening 25 of the receiving section 24. The longitudinal axis 26 of the shaft 20 of the fastening screw 14 is coaxial to a longitudinal axis 26 of the receiving opening 25. An inner diameter of the receiving section 24 is somewhat smaller than the maximum outer diameter of the shaft 20, i.e., of the outer thread 22, of the fastening screw 14. In this way, the fastening screw 14 is fixedly and thus captively secured into the receiving section 24. As a result of elasticity of the receiving section 24, the fastening screw 14 is axially movable relative to the receiving section 24 along the longitudinal axis 26. The movement of the fastening screw 14 in the receiving section 24 can be realized by either one or both of a sliding or a screwing movement.

On the radial outer circumferential side of the cylindrical receiving section 24, there are three identical elastic flexible holding arms 28 fixed to the radial outer side of the cylindrical receiving section 24 and extending radially outwardly therefrom. The elastic flexible holding arms 28 are distributed uniformly in circumferential direction on the radial outer circumferential side of the cylindrical receiving section 24. The holding arms 28 are connected monolithically and preferably formed monolithically with the receiving section 24. The holding arms 28 each have, viewed radially relative to the longitudinal axis 26, an S-shaped course along its radial outwardly extension. The holding arms 28 each have also an extension circumferentially relative to the longitudinal axis 26.

Each one of the holding arms 28 is connected with a fastening end 32 onto the receiving section 24. An imaginary center axis 30 defining the radial outwardly extension direction of the holding arm 28 extends perpendicularly to the longitudinal axis 26 in radial direction. The center axis 30 is located in a center plane of the holding arm 28 which extends axially to the longitudinal axis 26. The fastening end 32 of the holding arm 28 is located in the area of a first end face 33 of the receiving section 24. The first end face 33 is facing away from the screw head 34 of the fastening screw 14.

The first section 36 of the holding arm 28 extends at a slant relative to the longitudinal axis 26 in radial direction outwardly from the fastening end 32 and from the first end face 33 in the direction toward an oppositely positioned second end face 38 of the receiving section 24. Viewed axially relative to the longitudinal axis 26, the first section 36 passes after a U-shaped bend into a second section 40, the U-shaped bend arranged approximately at the level of the second end face 38 of the receiving section 24 that is facing the screw head 34. The second section 40 extends approximately parallel to the longitudinal axis 26 in the direction toward the first end face 33 of the receiving section 24.

Approximately at the level of the first end face 33, the second section 40 forms a second U-shaped bend which passes into an insertion section 42 after the second bend. The insertion section 42 is axially elongated to extend approximately parallel to the longitudinal axis 26 from the second bend in the direction of the second end face 38. The insertion section 42 ends approximately at the level of the second end face 38 of the receiving section 24. In a mechanically tension-free basic state of the holding means 16, as illustrated in FIGS. 1 through 4, the insertion sections 42 of the holding arms 28 each extend circumferentially about the longitudinal axis 26 approximately along a common imaginary circular cylinder wall. The insertion sections 42 each are appropriately curved in accordance with the circular cylinder wall.

On circumferentially opposite sides relative to the longitudinal axis 26, the insertion section 42 forms a spring arm 44, respectively. Each spring arm 44 is connected monolithically with one end at the level of the second end face 38 of the receiving section 24 with the insertion section 42. The spring arms 44 extend each approximately parallel to the longitudinal axis 26. Between the spring arms 44 and the insertion section 42 there is a gap 48, respectively, which allows freedom of movement of the spring arms 44 circumferentially relative to the longitudinal axis 26.

At the free end of each spring arm 44 there is a locking nose 46, respectively. The locking noses 46 extend circumferentially relative to the longitudinal axis 26 on the sides of the spring arms 44 that are facing away from the insertion section 42. On the side that is facing the free end of the spring arm 44, the locking noses 46 are provided with a slant. On the side of the spring arm 44 that is facing away from the free end of the spring arm 44, each of the locking noses 46 has a circumferentially outwardly extending locking shoulder 50. The circumferential extension of the first section 36 and of the second section 40 of each holding arm 28 relative to the longitudinal axis 26 is smaller than the maximum circumferential extension of the insertion section 42 and of the spring arms 44 with the locking noses 46.

In each mounting opening 18 there are three holding arm receptacles 52 arranged in the connecting flanges 12 of the intake pipe part 10. The holding arm receptacles 52 each have an insertion receptacle 54. The insertion receptacles 54 are arranged in radial direction outwardly relative to a longitudinal axis of the mounting opening 18. In the mechanically tension-free basic state of the holding means 16, the longitudinal axis of the mounting opening 18 is identical to the longitudinal axis 26 of the receiving section 24. Circumferential central planes of the three insertion receptacles 54 are located on an imaginary circular cylinder wall whose radius corresponds to the radius of the aforementioned imaginary circular cylinder wall of the insertion section 42 of the three holding arms 28. The insertion receptacles 54 are open toward the side of the connecting flange 12 which is facing away from the further component to be attached later. The shape of the insertion receptacles 54 corresponds to the shape of the insertion sections 42, respectively. In this context, relative to the longitudinal axis of the mounting opening 18, the circumferential extension of the insertion receptacle 54 is somewhat smaller than the maximum circumferential extension of the insertion sections 42 with the spring arms 44 in the region of the highest location of the locking noses 46. The extension axial to the longitudinal axis 26 or to the mounting opening axis corresponds approximately to the axial extension of the insertion sections 42. In this way, the insertion sections 42 are completely immersed in the insertion receptacles 54.

On the end face that is oppositely positioned in axial direction relative to the open end face of the insertion receptacles 54, the forward and rearward lateral limitation of the insertion receptacles 54 in circumferential direction each have a locking receptacle for the locking noses 46. The locking receptacles are hidden in FIGS. 1 to 4 and are therefore not shown.

The insertion receptacles 54 each are connected by means of an insertion gap 56 with the mounting opening 18. Accordingly, the insertion receptacles 54 are open relative to the mounting opening 18. The insertion gaps 56 in the circumferential direction are somewhat greater than the circumferential extension of the first sections 36 and the second sections 40 of the holding arms 28. The insertion gaps 56 are open toward the side of the connecting flange 12 which is facing away from components to be mounted later on. The insertion gaps 56 each extend axially relative to the longitudinal axis of the mounting opening 18, i.e., relative to the longitudinal axis 26, across the entire axial extension of the insertion receptacle 54.

Mounting of the intake pipe is described in the following in an exemplary fashion. The intake pipe part 10, the further components of the intake manifold, the holding means 16, and the fastening screws 14 are separately manufactured.

The fastening screws 14, with their shaft 20 leading, are inserted axially relative to the longitudinal axis 26 from the first end face 33 into the corresponding receiving sections 24 of the holding means 16. The fastening screws 14 are inserted so far into the receiving sections 24 that the tips of the shafts 20 project barely axially outwardly from the receiving sections 24. The fastening screws 14 in this way are clamped in the holding means 16 so that a pre-mounted captive component combination results.

The holding means 16 with the fastening screws 14 are inserted into the respective mounting openings 18 from the sides of the connecting flanges 12 which are facing away from further components to be mounted later. In this context, the holding means 16 with their longitudinal axes 26 are coaxially arranged relative to the longitudinal axes of the mounting openings 18. The holding means 16 are rotated about their longitudinal axes 26 such that one insertion section 42 is correlated with one of the holding arm receptacles 52, respectively. Upon insertion of the holding means 16 the spring arms 42 with the locking noses 46 yield elastically. As soon as the locking noses 46 have reached the appropriate locking receptacle, they lock therein. In this way, locking connections between the holding means 16 and the connecting flanges 12 are formed.

The holding means 16 are secured mechanically free of tension with the holding arms 28 in the mounting opening 18. The fastening screws 14 are thus secured by means of the holding means 16 captively in the connecting flange 12. A radial outer circumference of each receiving section 24 is smaller than a radial inner diameter of the corresponding mounting opening 18. In the mechanical tension-free basic position, the longitudinal axes 26 of the receiving sections 24, the longitudinal axes of the fastening screws 14, and the longitudinal axis of the mounting opening 18 extend coaxial. Between the radial outer circumferential side of the receiving section 24 and the radial inner circumferential side of the mounting opening 18 there is a uniform annular gap 58. The annular gap 58 enables tilting and/or radial movement of the receiving section 24 and thus of the fastening screw 14 within the mounting opening 18. The elasticity of the holding arms 28 allows radial movement and tilting of the fastening screw 14 in the mounting opening 18.

For connecting the intake pipe part 10 with further components of the intake manifold, the connecting flanges 12 are placed against appropriate connecting flanges of the other components and the fastening screws 14 are screwed into appropriate screw holes of the connecting flanges of the other components.

In the above-described embodiment of an intake pipe part 10 and holding means 16 inter alia the following modifications are possible.

The invention is not limited to use in connection with the intake pipes of internal combustion engines of motor vehicles. Instead, it can also be used for other types of components which, by means of at least one fastening means, for example, fastening screw, are to be connected detachably with each other. The invention can be used outside of automotive technology, for example, in industrial motors.

Instead of being made of polypropylene, the holding means 16 can be made also of a different flexible material, preferably an elastic plastic material, for example, polyethylene terephthalate (PET), polybutylene terephthalate (PBT) or polyamide (PA).

It is also possible to arrange more or fewer than three holding arms 28 on each receiving section 24.

In place of the sleeve-type receiving sections 24, also different types of sections each having an appropriate receiving opening for the fastening screws 14 can be provided.

Instead of the fastening screws 14, also different types of bolt-type fastening means, for example, bolts or pins, can be provided. Also, different types of bolt-type fastening means can be provided that can be locked by means of a rotation and/or insertion movement. For example, the bolt-type fastening means can have a shaft with a connecting part of a bayonet-type connection which can be locked with an appropriate other connecting part in the respective other component.

The receiving section 24 can also be provided on its radial inner circumferential side with an inner thread that is match the outer thread 22 and into which the outer thread 22 of the fastening screw 14 can be screwed.

Instead of being S-shaped, the holding arms 28 can also be extending in a different way in a wave shape or zigzag shape.

I claim:

1. A device securely connecting and mounting together two components (10) of an internal combustion engine, comprising
at least one holding means (16) configured for arrangement within a respective mounting opening (18) on a first one of the two components (10);
a bolt-type fastening means (14), respectively, with which the two components (10) can be securely connected with each other;
wherein the at least one holding means (16) includes a cylindrical axially extending receiving section (24) having a receiving opening (25) extending axially therethrough into which the bolt fastening means (14) is received; and
at least two flexible holding arms (28) secured to the cylindrical receiving section and extending radially outwardly at least radially relative to a longitudinal axis (26) of the receiving opening (25) away from the receiving section (24) in outward direction;
wherein the at least two flexible holding arms (28) are configured to secure the at least one holding means (16) into in the mounting opening (18) of the first component, and wherein at least one of the at least two holding arms (28) has at its radial outer end (42) relative to the longitudinal axis (26) of the receiving opening (25) at least one locking device (44, 46) with which the at least one holding arm (28) configured to engage an appropriate counter locking device on the first component (10) to produce a locking connection;
wherein the at least two holding arms (28), viewed radially relative to the longitudinal axis (26) of the receiving opening (25), each extend radially outwardly along a wave-shaped or a zigzag-shaped course.

2. The device according to claim 1, wherein
at least three holding arms (28) are arranged directly on the circumferential radial outer side of the receiving section (24) and are distributed circumferentially, on the radial outer side of the receiving section (24).

3. The device according to claim 1, wherein
a smallest inner diameter of the receiving opening (25) of the receiving section (24) of the at least one holding means (16) is smaller than a greatest outer diameter of the bolt-type fastening means (14).

4. The device according to claim 1, wherein
the first component (10) has at least one holding arm receptacle (52) for at least one of the at least two holding arms (28).

5. The device according to claim 1, wherein
the at least one holding means (16) is made of a flexible material, in particular plastic material, in particular polyamide (PA), polypropylene (PP), polyethylene terephthalate (PET) or polybutylene terephthalate (PBT).

6. A holding means (16) of the device according to claim 1 for securely connecting two components (10) of an internal combustion engine for holding in a mounting opening (18) on a first one of the two components (10) a bolt-type fastening means (14), with which the two components (10) can be connected to each other, wherein the holding means (16) has a receiving section (24) with a receiving opening (25) for the fastening means (14) and at least two flexible holding arms (28) that extend at least radially to a longitudinal axis (26) of the receiving opening (25) away from the receiving section (24) in outward direction and with which the at least one holding means (16) can be secured in the mounting opening (18), wherein the at least two holding arms (28), viewed radially relative to the longitudinal axis (26) of the receiving opening (25), each have a wave-shaped or a zigzag-shaped course.

7. A first component (10) of an internal combustion engine with at least one mounting opening (18) configured to receive a holding means (16), respectively, of a device for connecting two components (10) according to claim 1:
wherein the at least one mounting opening (18) is configured to receive the holding means (16) therein;
wherein the holding means is configured top receive and hold a bolt-type fastening means (14);
wherein the first component mates against and securely mounted onto a second component by the holding means (16) and bolt-type fastening means (14);
wherein the holding means (16) has a receiving section (24) with a receiving opening (25) receiving and engaging with the fastening means (14);
wherein at least two flexible holding arms (28) are formed onto a radially outer side of the receiving section and extend at least radially relative to a longitudinal axis (26) of the receiving opening (25) away from the receiving section (24) in outward direction;
wherein the holding means (16) is secured engaged into the at least one mounting opening (18) by the at least two flexible holding arms (28); and wherein the component (10) includes at least one holding arm receptacle (52) receiving and engaging with at least one of the at least two holding arms (28) of the holding means (16).

\* \* \* \* \*